(12) United States Patent
Yang et al.

(10) Patent No.: US 11,803,005 B1
(45) Date of Patent: Oct. 31, 2023

(54) BACKLIGHT MODULE AND DISPLAY DEVICE

(71) Applicant: HKC CORPORATION LIMITED, Shenzhen (CN)

(72) Inventors: Xiaohui Yang, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/088,745

(22) Filed: Dec. 26, 2022

(30) Foreign Application Priority Data

Aug. 1, 2022 (CN) .......................... 202210916923.6

(51) Int. Cl.
*F21V 8/00* (2006.01)

(52) U.S. Cl.
CPC .......... *G02B 6/0085* (2013.01); *G02B 6/0073* (2013.01)

(58) Field of Classification Search
CPC ............................ G02B 6/0085; G02B 6/0073
See application file for complete search history.

(56) References Cited

U.S. PATENT DOCUMENTS

| | | |
|---|---|---|
| 2007/0046617 A1 | 3/2007 | Song |
| 2009/0040417 A1* | 2/2009 | Nagaoka ........... G02F 1/133604 |
| | | 349/58 |
| 2012/0281167 A1 | 11/2012 | Nakatsuka |
| 2013/0148379 A1* | 6/2013 | Zhou .................... G02B 6/0088 |
| | | 362/613 |

FOREIGN PATENT DOCUMENTS

| | | | |
|---|---|---|---|
| CN | 101364006 | A | 2/2009 |
| CN | 207457659 | U | 6/2018 |
| CN | 111025747 | A | 4/2020 |
| CN | 111913320 | A | 11/2020 |
| CN | 114488614 | A | 5/2022 |
| CN | 114994986 | A | 9/2022 |
| JP | 2008165101 | A | 7/2008 |
| JP | 2009192728 | A * | 8/2009 |
| JP | 2009192728 | A | 8/2009 |
| JP | 2011113904 | A * | 6/2011 |
| JP | 2011113904 | A | 6/2011 |
| KR | 2011037074 | A * | 4/2011 |
| WO | WO-2019134198 | A1 * | 7/2019 ........... G02B 6/0085 |

OTHER PUBLICATIONS

Wang, Mingchao, the ISA written comments, Feb. 2023, CN.
Wang, Mingchao, the International Search Report, Feb. 2023, CN.

* cited by examiner

*Primary Examiner* — Mary Ellen Bowman

(57) ABSTRACT

A backlight module and a display device are disclosed. The backlight module includes a back plate and a light plate arranged on the back plate. A cavity is defined between the back plate and the light plate. The backlight module further includes a heat radiation material layer that is arranged in the cavity and attached to the side of the light plate facing the back plate. A gap is defined between the heat radiation material layer and the back plate.

16 Claims, 4 Drawing Sheets

BACKLIGHT MODULE AND DISPLAY DEVICE

CROSS-REFERENCE TO RELATED APPLICATIONS

This application claims the priority and benefit of Chinese patent application number 202210916923.6, titled "Backlight Module and Display Device" and filed Aug. 1, 2022 China National Intellectual Property Administration, the entire contents of which are incorporated herein by reference.

TECHNICAL FIELD

The present application relates to the field of display technology, and more particularly relates to a backlight module and a display device.

BACKGROUND

The description provided in this section is intended for the mere purpose of providing background information related to the present application but doesn't necessarily constitute prior art.

With the development and maturity of Mini LED (Mini light-emitting diode) display technology, displays using Mini LED backlight (TV, MNT, NB, etc.) have gradually entered the homes of mass users and are widely used. However, due to the large number of Mini LED lamp beads and high heat generation, heat dissipation has become a major problem. If not handled properly, the LEDs will work at high temperature for a long time, which will greatly reduce the life of the LEDs.

One possible method uses a metal back plate to directly dissipate heat from the light plate, but the efficiency of such heat dissipation is still relatively low and cannot meet the heat dissipation requirements of Mini LED displays. Therefore, how to efficiently dissipate heat from the light plate in the Mini LED display and improve the service life of the display has become an urgent problem to be solved.

SUMMARY

In view of the above, it is a purpose of the present application to provide a backlight module and a display device, whereby the heat dissipation of the light plate is more efficient and the service life of the display is increased.

The application discloses a backlight module. The backlight module includes a back plate and a light plate disposed on the back plate. A cavity is defined between the back plate and the light plate. The backlight module further includes a heat radiation material layer. The heat radiation material layer is arranged in the cavity and is attached to the side of the light plate facing the back plate. A gap is defined between the heat radiation material layer and the back plate.

The application further discloses a backlight module, which includes a back plate and a light plate. The light plate is arranged on the back plate. A cavity is formed between the back plate and the light plate. The backlight module further includes a heat radiation material layer, and the heat radiation material layer is arranged in the cavity and attached to the side of the light plate facing the back plate. A gap is provided between the heat radiation material layer and the back plate. The size of the gap is 0.2-0.5 mm. The manufacturing material of the heat radiation material layer includes graphitic carbon. The thickness of the heat radiation material layer is 0.02 mm. The back plate includes a plurality of sinking grooves, and the sinking grooves are strip-shaped. The plurality of sinking grooves are arranged at intervals in the vertical direction. The direction of extension of the plurality of sinking grooves is consistent with the direction of extension of the data lines in the display panel corresponding to the backlight module. Taking the side of the data lines gradually going away from the flexible circuit board in the display panel as the first direction, the widths of the plurality of sinking grooves each gradually increase along the first direction, and the orthographic projection of the heat radiation material layer covers the sinking groove. The backlight module further includes a heat absorption layer. The heat absorption layer is composed of thermally conductive silicone. A plurality of protrusions are formed on one side of the heat absorption layer adjacent to the light plate to form a sawtooth structure.

The present application further discloses a display device, which includes a display panel and the above-mentioned backlight module, wherein the backlight module provides a backlight source for the display panel.

Compared with the solution that merely uses the metal back plate to dissipate heat from the light plate, in the present application, a cavity is defined between the light plate and the back plate, and then a heat radiation material layer is arranged in the cavity, and the heat radiation material layer is attached to the side of the light plate facing the back plate, that is, the bottom surface of the light plate, and further a gap is also defined between the heat radiation material layer and the back plate, so that the characteristics of the heat radiation material can be used to actively absorb the heat of the light plate. After the heat radiation material layer absorbs the heat on the light plate, it radiates heat toward the gap between the heat radiation material layer and the back plate, which has an active heat dissipation effect on the light plate, so that the heat dissipation efficiency is higher.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

DETAILED DESCRIPTION OF EMBODIMENTS

Figure 1:
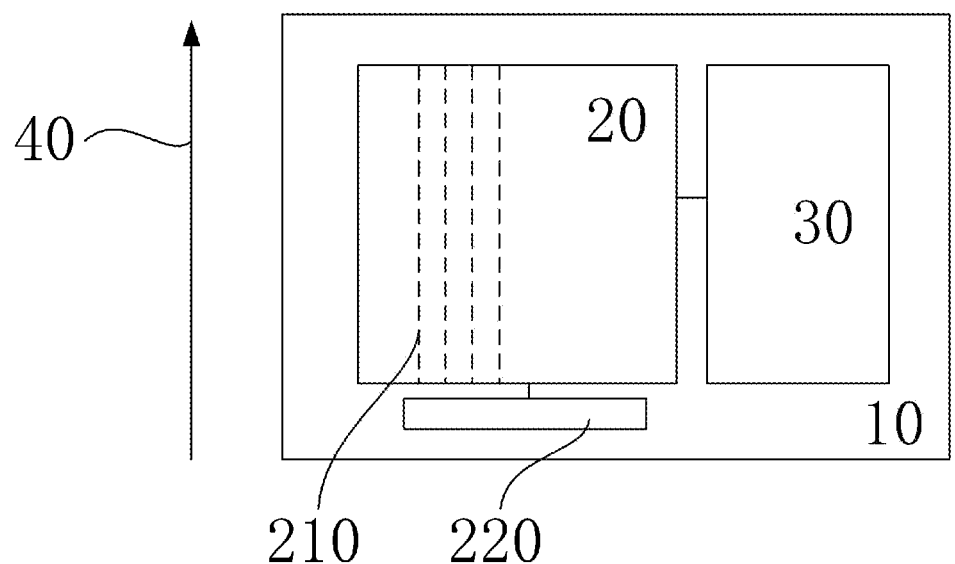
FIG. 1 is a schematic diagram of a display device of the present application.

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. Term "comprising", "including", and any variants thereof mean non-exclusive inclusion, so that one or more other features, integers, steps, operations, units, components, and/or combinations thereof may be present or added.

In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Furthermore, as used herein, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application can be understood depending on specific contexts.

Hereinafter this application will be described in further detail with reference to the accompanying drawings and some optional embodiments.

FIG. 1 is a schematic diagram of a display device of the present application. As shown in FIG. 1, a display device 10 is disclosed, including a backlight module 30 and a display panel 20 that are arranged oppositely. The backlight module 30 provides a backlight source for the display panel 20 to display images.

The display panel 20 further includes data lines 210 and a flexible circuit board 220 connected thereto. The direction of the data line 210 going away from the flexible circuit board 220 in the display panel 20 is the first direction 40. It can also be understood that when the user uses the display device 10, the direction pointing from the bottom to the top of the display panel 20 is the first direction 40.

The application further discloses a backlight module 30, which may be used in the display device 10 as described above. For the backlight module 30, the application provides the following designs.

First Embodiment

Figure 2:
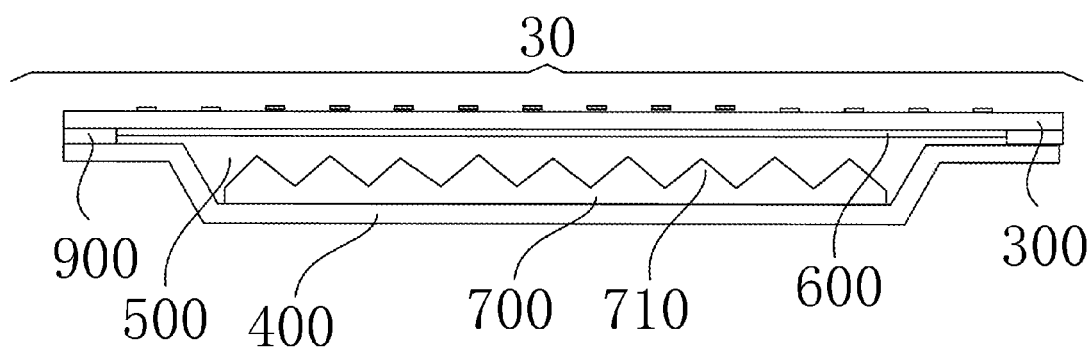
FIG. 2 is a schematic diagram of a first backlight module according to a first embodiment of the present application.

FIG. 2 is a schematic diagram of a first backlight module according to a first embodiment of the present application. As shown in FIG. 2, a backlight module 30 is disclosed. The backlight module 30 includes a back plate 400 and a light plate 300 disposed on the back plate 400. A cavity is formed between the back plate 400 and the light plate 300. The cavity can be formed by sticking a circle of a square shaped adhesive 900 on the edges of the back plate 400, and then sticking the light plate 300 on the back plate 400. Since the square shaped adhesive 900 has a certain thickness, a cavity is formed between the middle area of the light plate 300 and the back plate 400, and the cost can also be saved. Alternatively, the cavity may be formed between the light plate 300 and the back plate 400 by arranging tiny support posts between the light plate 300 and the back plate 400.

The backlight module 30 further includes a heat radiation material layer 600. The material for making the heat radiation material layer 600 is composed of one or more of carbon black, graphitic carbon, carbon nanotubes, nickel oxide, and iron oxide. In one embodiment, the heat radiation material of the present application is graphitic carbon, which is more cost-effective than other heat radiation materials.

The heat radiation material layer 600 is disposed in the cavity and is attached to the side of the light plate 300 facing the back plate 400. The heat radiation material layer 600 may cover an entirety of the bottom surface of the light plate 300. When the heat radiation material layer 600 covers the entire bottom surface of the light plate 300, the heat dissipation effect of the light plate 300 will be better. Of course, the heat radiation material layer 600 may also uniformly cover a partial area of the bottom surface of the light plate 300, which can save materials, thereby reducing the production cost of the backlight module 30.

Moreover, a gap is defined between the heat radiation material layer 600 and the back plate 400. The size of the gap between the back plate 400 and the light plate 300 is 0.2-0.5 mm. The graphitic carbon is disposed on the side of the light plate 300 adjacent to the back plate 400 by spraying, and the thickness of the heat radiation material layer 600 is 0.02 mm. In this way, the distance between the heat radiation material layer 600 and the back plate 400 is at least 0.18-0.48 mm, which ensures sufficient heat dissipation space.

Compared with the solution that only uses the metal back plate to dissipate heat from the light plate, in this embodiment, a cavity is defined between the light plate 300 and the back plate 400, and then a heat radiation material layer 600 is arranged in the cavity and is attached to the side of the light plate 300 facing the back plate 400, i.e., the bottom surface of the light plate 300, and further gap needs to be defined between the heat radiation material layer 600 and the back plate 400. In this way, the characteristics of the heat radiation material can be used to actively absorb heat from the light plate 300. After the heat radiation material layer 600 absorbs the heat on the light plate 300, the heat is radiated toward the gap between the heat radiation material layer 600 and the back plate 400, which has an active heat dissipation effect on the light plate 300, and so the heat dissipation efficiency is higher.

Moreover, the back plate 400 is recessed toward the side away from the light plate 300 to form a sinking groove 500. That is to say, it can be understood that the edges of the back plate 400 are all dented downward except for the annular area where the edges of the back plate 400 are attached to the light plate 300 with the square shaped adhesive 900.

The orthographic projection of the heat radiation material layer 600 covers the sinking groove 500. By arranging the sinking groove 500 in the back plate 400, and the sinking groove 500 corresponds to the position of the heat radiation material layer 600, the gap between the heat radiation material layer 600 and the back plate 400 is further increased, and so more space is provided for the heat radiation material layer 600 to actively absorb heat from the light plate 300 and radiate heat into the gap.

In this embodiment, a heat absorption layer 700 is also disposed in the sinking groove 500, and the heat absorption layer 700 is attached to the groove bottom 510 of the sinking groove 500. The heat absorption layer 700 is made of thermally conductive silicone. The thickness of the heat absorption layer 700 is smaller than the gap between the heat radiation material layer 600 and the bottom surface of the sinking groove 500. The heat radiated from the heat radiation material layer 600 is actively absorbed by the heat absorption layer 700, and the heat is transferred to the back plate 400 for heat dissipation. Compared with heat dissipation only by means of heat transfer, the heat absorption layer 700 in this embodiment can actively absorb the heat radiated from the heat radiation material layer 600, so that the heat dissipation efficiency is higher.

In addition, the heat absorption layer 700 and the heat radiation material layer 600 cooperate with each other, so that the more heat the heat absorption layer 700 absorbs, the more heat the heat radiation material layer 600 absorbs and radiates from the light plate 300, which can further dissipate heat from the light plate 300. Moreover, compared with other materials, the price of thermally conductive silicone is cheaper, which can reduce the production cost.

Of course, a phase change energy storage material may alternatively be used to replace the thermally conductive silicone. Different from the heat absorption layer 700 made of thermally conductive silicone, the heat absorption layer 700 made of the phase change energy storage material absorbs the heat radiated from the heat radiation material layer 600 into the material itself, so that the heat does not need to be conducted to the back plate 400, and so it will not cause the back plate 400 to get hot. Moreover, compared with the heat absorption layer 700 made of thermally conductive silicone, the phase change energy storage material has a higher heat absorption efficiency, and also improves the heat radiation efficiency of the heat radiation material layer 600, thereby improving the heat dissipation efficiency of the light plate 300.

A plurality of protrusions 710 are formed on one side of the heat absorption layer 700 adjacent to the light plate 300 to form a sawtooth structure. The distance between two adjacent protrusions 710 in the sawtooth structure is 5-10 mm, and the cross section of each of the protrusions 710 is an isosceles triangle with an included angle of 45°. By arranging a sawtooth structure on the side of the heat absorption layer 700 adjacent to the heat radiation material layer 600, the surface area of the heat absorption layer 700 can be increased, and the heat absorption efficiency can be improved.

Figure 3:
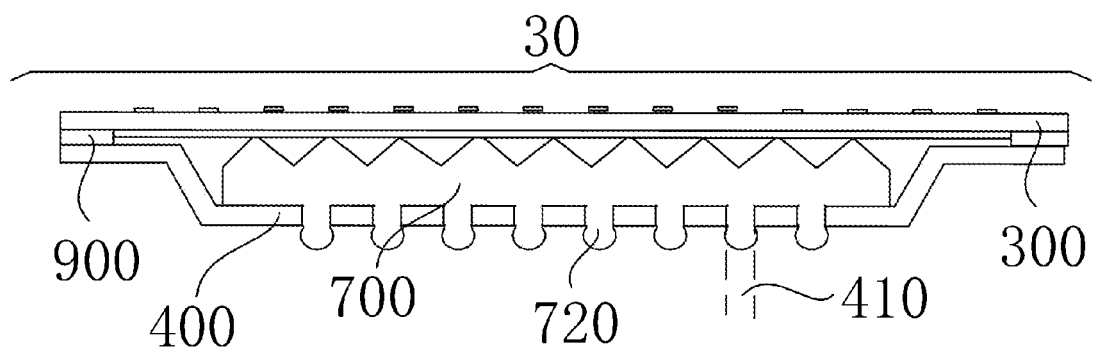
FIG. 3 is a schematic diagram of a second backlight module according to the first embodiment of the present application.
Figure 4:
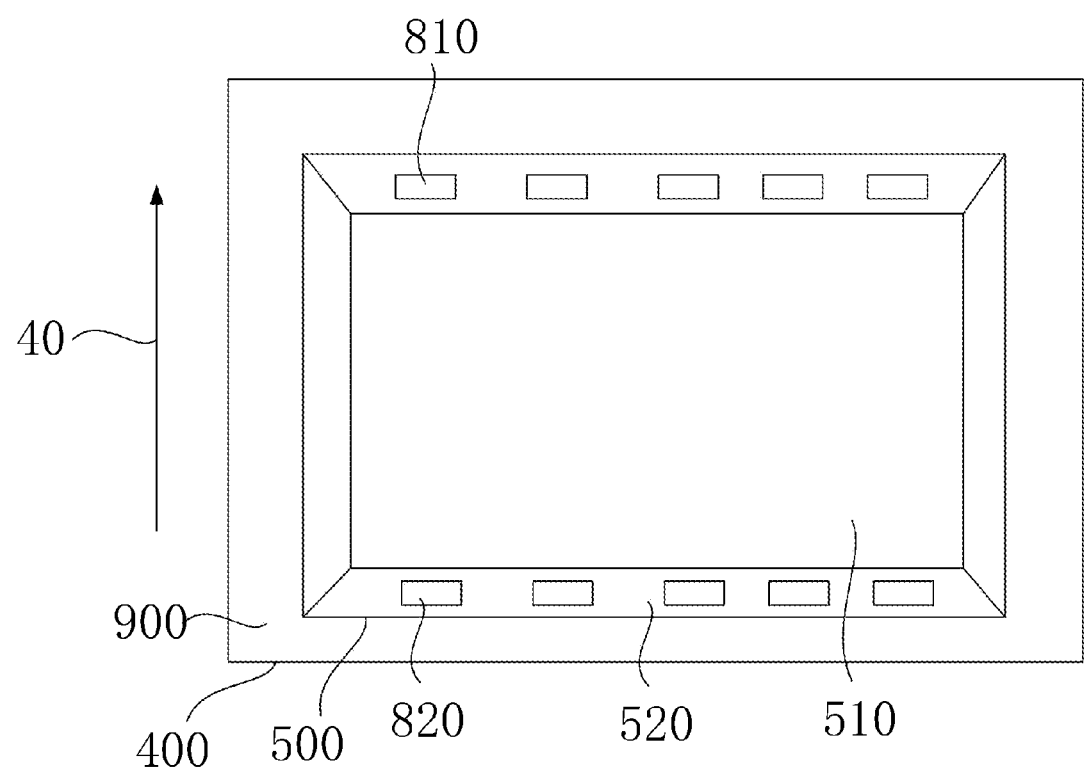
FIG. 4 is a plan view of a backlight module according to the first embodiment of the present application.

FIG. 3 is a schematic diagram of a second backlight module according to the first embodiment of the present application. As shown in FIGS. 3 and 4, the thickness of the heat absorption layer 700 may also be greater than or equal to the gap between the heat radiation material layer 600 and the bottom 510 of the sinking groove 500. When the thickness of the heat absorption layer 700 is equal to the gap, the first side of the heat absorption layer 700 is attached to the groove bottom 510 of the sinking groove 500, and the first side of the heat absorption layer having the sawtooth structure is in contact with the heat radiation material layer 600.

Specifically, the heat absorption layer 700 is made of thermally conductive silicone, which has elasticity. The thickness of the heat absorption layer 700 is greater than or equal to the distance from the side of the light plate 300 adjacent to the back plate 400 to the bottom surface of the sinking groove 500.

In this embodiment, the thickness of the heat absorption layer 700 is increased, which can play a supporting role for the light plate 300 and prevent the light plate 300 in the assembled backlight module 30 from sinking in the middle area. Furthermore, because the heat absorption layer 700 in this embodiment has elasticity, making the heat absorption layer 700 thick so as to press against the light plate 300 can absorb the pressure received by the light plate 300 during transportation and convert it into elasticity, so as to buffer the light plate 300. For example, when the light plate 300 is glass-based, the light plate 300 can be prevented from being broken which may result in that the light plate 300 cannot be used normally.

Further, the bottom surface of the sinking groove 500 in this embodiment, namely the bottom 510 of the sinking groove, is provided with a plurality of through holes 410, the heat absorption layer 700 is formed of thermally conductive silicone, and a plurality of bulging portions 720 are disposed at positions of the thermally conductive silicone corresponding to the through holes 410, and these bulging portions 720 extend out of the through holes 410. After the heat absorption layer 700 made of thermally conductive silicone absorbs the heat radiated from the heat radiation material layer 600, the part in contact with the back plate 400 directly conducts the heat to the back plate 400 for heat dissipation. The part of the bulging portions 720 extending out of the through holes 410 directly dissipate heat to the external air, so that the heat dissipation efficiency becomes higher.

Moreover, when the light plate 300 is squeezed, the pressure on the light plate 300 will be absorbed by the thermally conductive silicone, converted into elastic potential energy, and stored in the thermally conductive silicone. The elastic potential energy inside the thermally conductive silicone can be released toward the outside of the back plate 400 through the bulging portions 720, and will not directly act on the light plate 300 in reverse, so that the buffering effect is better.

Figure 5:
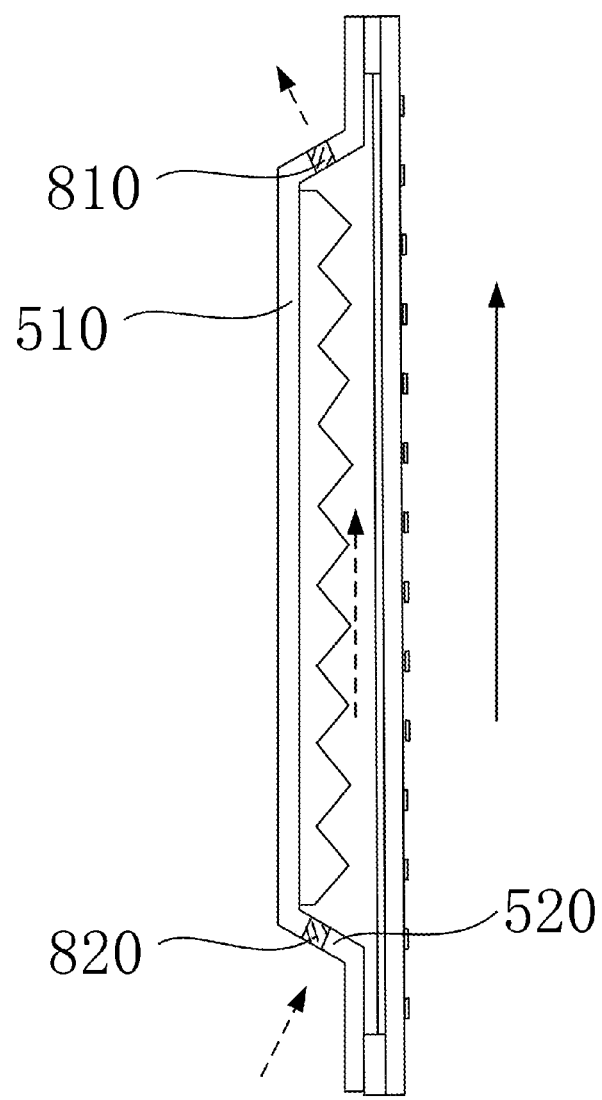
FIG. 5 is a cross-sectional view of a backlight module according to the first embodiment of the present application.

FIG. 4 is a plan view of a backlight module according to the first embodiment of the present application. FIG. 5 is a cross-sectional view of a backlight module according to the first embodiment of the present application. As shown in FIGS. 4 and 5, in this embodiment, an air inlet 820 and an air outlet 810 are also defined in the groove wall 520 of the sinking groove 500, and the air inlet 820 and the air outlet 810 are disposed arranged along the first direction 40. The air outlet 810 is located in the direction of extension of the air inlet 820 along the first direction 40. The heat radiated from the heat radiation material layer 600 in the sinking groove 500 heats the air in the sinking groove 500. Because the hot air has the characteristic of flowing upward, the hot air in the sinking groove 500 can move in the direction shown by the arrow in the figure without needing to add an exhaust device, and so the hot air in the sinking groove 500 can be discharged from the air outlet 810. At this time, the air pressure in the sinking groove 500 is reduced, and the cold air outside the back plate 400 will enter the sinking groove 500 from the air inlet 820 to form a cycle, which further improves the heat dissipation efficiency of the light plate 300.

Second Embodiment

Figure 6:
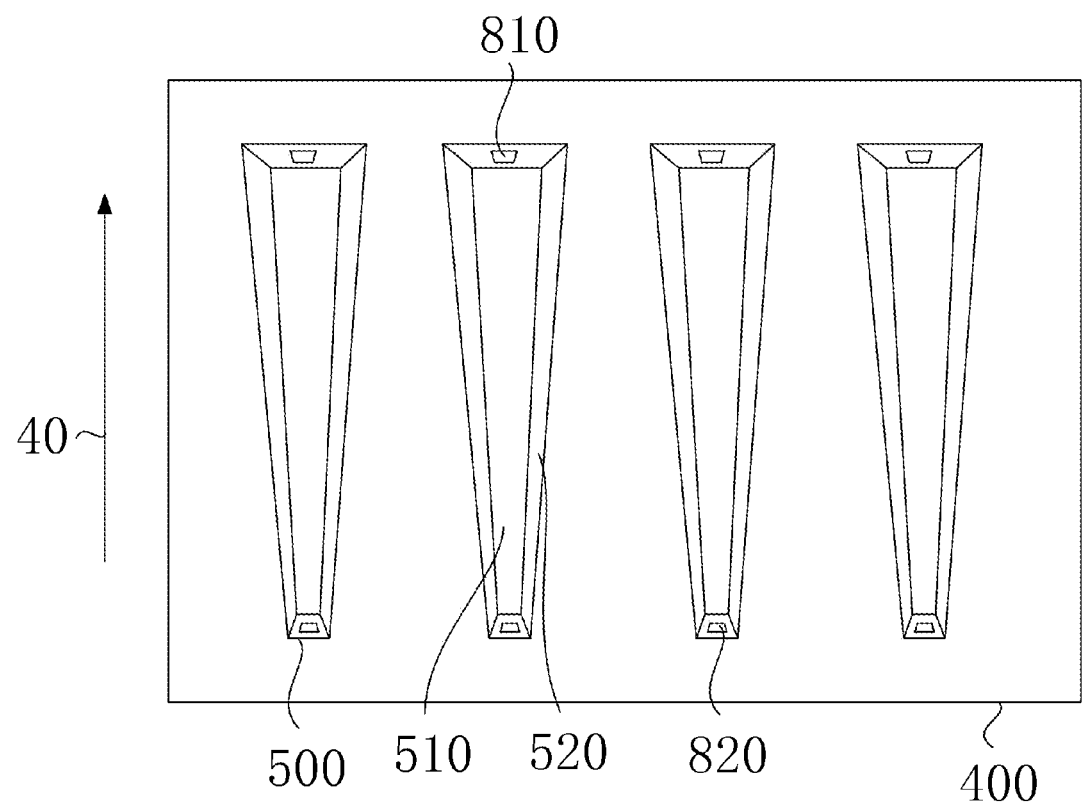
FIG. 6 is a schematic plan view of a back plate according to the second embodiment of the present application.

FIG. 6 is a schematic plan view of a back plate according to a second embodiment of the present application. Different from the first embodiment, the back plate 400 of this embodiment has a plurality of sinking grooves 500, and the width of each of the sinking grooves 500 along the direction of extension of the first direction 40 increases continuously, as follows.

The back plate 400 includes a plurality of sinking grooves 500, and the sinking grooves 500 are strip-shaped. The plurality of sinking grooves 500 are arranged at intervals in the vertical direction. The direction of extension of the plurality of sinking grooves 500 is consistent with the direction of extension of the data lines 210 in the display panel 20 corresponding to the backlight module 30. Taking the side of the data lines 210 gradually going away from the flexible circuit board 220 of the display panel 20 as the first direction 40, the widths of the plurality of sinking grooves 500 each gradually increase along the first direction 40. The first direction 40 can also be understood as the direction from bottom to top when the user is facing the display area.

Since the hot air in the sinking groove 500 continuously rises along the first direction 40, the heat in the sinking groove 500 along the first direction 40 continues to increase, resulting in uneven heat dissipation of the light plate 300 in the first direction 40. That is, for the upper part and the lower part of the sinking groove 500, there is the problem of a big difference in the amount of heat per unit area. In particular, the heat in the lower part of the sinking groove 500 is relatively less, while the heat in the upper part of the sinking groove 500 is relatively more. In this embodiment, the widths of the plurality of sinking grooves 500 are gradually increased along the first direction 40, corresponding to the area with more heat, there is more heat absorption layer 700, and so the heat dissipation efficiency is higher. In addition, the further up the sinking groove 500, the larger the space, the more heat can be accommodated; and the larger the space is, the more heat absorption layers 700 can be accommodated, thereby balancing the heat dissipation of the entire light plate 300.

Third Embodiment

Figure 7:
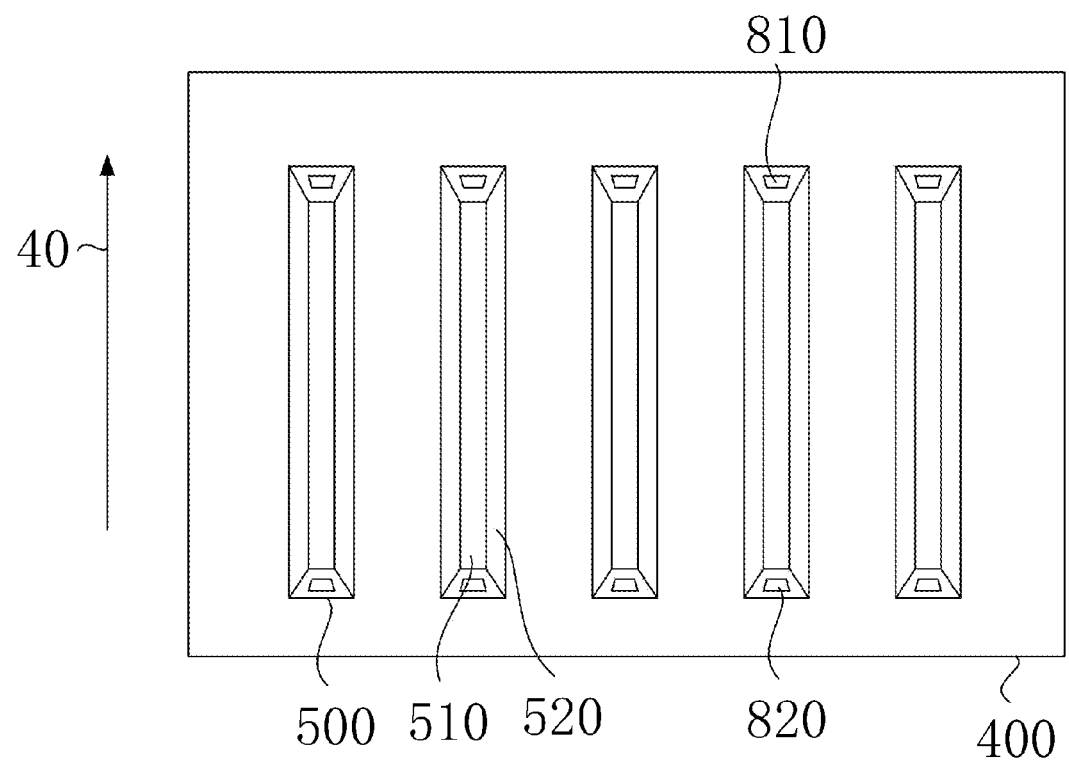
FIG. 7 is a schematic plan view of a back plate according to a third embodiment of the present application.

FIG. 7 is a schematic plan view of a back plate according to a third embodiment of the present application. Different from the first embodiment, the back plate 400 of this embodiment has a plurality of sinking grooves 500, the details are as follows.

The back plate 400 includes a plurality of sinking grooves 500, and the sinking grooves 500 are strip-shaped. The plurality of sinking grooves 500 are arranged at intervals in the vertical direction. The direction of extension of the plurality of sinking grooves 500 is consistent with the direction of extension of the data lines 210 in the display panel 20 corresponding to the backlight module 30.

Compared with the first embodiment, the back plate 400 and the light plate 300 in this embodiment have more contact area, and so the structural strength is greater. In addition, due to the increase in the number of sinking grooves 500, the heat dissipation area on the back plate 400 also increases, so that more heat absorption layer 700 can be provided, and the heat dissipation efficiency of the light plate 300 is also higher. Compared with the first embodiment, the back plate 400 of the present embodiment has a simpler structure and is more convenient to manufacture.

It should be noted that the inventive concept of the present application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The technical solutions of the present application can be widely used in various display panels, such as TN (Twisted Nematic) display panels, IPS (In-Plane Switching) display panels, VA (Vertical Alignment) display panels, and MVA (Multi-Domain Vertical Alignment) display panels, which are all applicable to the above solutions.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A backlight module, comprising a back plate and a light plate disposed on the back plate; wherein a cavity is formed between the back plate and the light plate;
   wherein the backlight module further comprises a heat radiation material layer, which is disposed in the cavity and is attached to a side of the light plate facing the back plate; and
   wherein a gap is defined between the heat radiation material layer and the back plate;
   wherein the back plate is recessed towards a side away from the light plate to define a sinking groove, and
   wherein an orthographic projection of the heat radiation material layer covers the sinking groove.

2. The backlight module of claim 1, wherein a material for making the heat radiation material layer comprises one or more selected from the group consisting of carbon black, graphitic carbon, carbon nanotubes, nickel oxide, and iron oxide.

3. The backlight module of claim 1, wherein the heat radiation material layer covers an entirety of a bottom surface of the light plate.

4. The backlight module of claim 1, wherein the heat radiation material layer covers a partial area of a bottom surface of the light plate.

5. The backlight module of claim 1, further comprising a heat absorption layer, which is made of thermally conductive silicone and is attached to the sinking groove.

6. The backlight module of claim 5, wherein a thickness of the heat absorption layer is smaller than that of the gap between the heat radiation material layer and a bottom surface of the sinking groove.

7. The backlight module of claim 5, wherein a side of the heat absorption layer adjacent to the light plate comprises a plurality of protrusions forming a sawtooth structure.

8. The backlight module of claim 7, wherein a distance between every two adjacent protrusions in the sawtooth structure lies in the range of 5 to 10 mm, and wherein a cross section of each of the plurality of protrusions is an isosceles triangle with an included angle of 45°.

9. The backlight module of claim 1, further comprising a heat absorption layer, which is made of a phase change energy storage material and is attached to an inner side of the sinking groove.

10. The backlight module of claim 5, wherein the back plate comprises a plurality of sinking grooves, which are strip-shaped, and wherein plurality of sinking grooves are each arranged along a vertical direction and are arranged at intervals;
   wherein a direction of extension of each of the plurality of sinking grooves is consistent with a direction of extension of a data line in the display panel corresponding to the backlight module;
   wherein taking a side of the data line gradually going away from the flexible circuit board in the display panel as a first direction, a width of each of the plurality of sinking grooves gradually increases along the first direction.

11. The backlight module of claim 10, further comprising an air inlet and an air outlet, which are defined in a groove wall of the sinking groove, wherein the air outlet is disposed in the direction of extension of the air inlet along the first direction.

12. The backlight module of claim 5, wherein a thickness of the heat absorption layer is greater than or equal to a distance from a side of the light plate adjacent to the back plate to a bottom surface of the sinking groove.

13. The backlight module of claim 12, wherein a plurality of through holes are defined in a bottom surface of the sinking groove, wherein the thermally conductive silicone comprises a plurality of bulging portions at positions corresponding to the plurality of through holes, and wherein the plurality of bulging portions protrude out of the respective through holes.

14. The backlight module of claim 1, wherein a size of the gap between the back plate and the light plate lies in the range of 0.2 to 0.5 mm, a material for making the heat radiation material layer comprises graphitic carbon disposed on a side of the light plate adjacent to the back plate, and wherein a thickness of the heat radiation material layer is 0.02 mm.

15. A backlight module, comprising a back plate and a light plate disposed on the back plate; wherein a cavity is formed between the back plate and the light plate;
   wherein the backlight module further comprises a heat radiation material layer, which is disposed in the cavity and is attached to a side of the light plate facing the back plate; and
   wherein a gap is defined between the heat radiation material layer and the back plate;
   wherein a size of the gap lies in the range of 0.2 to 0.5 mm, a material for making the heat radiation material layer comprises graphitic carbon, and wherein a thickness of the heat radiation material layer is 0.02 mm;
   wherein the back plate comprises a plurality of sinking grooves, which are strip-shaped, and wherein the plurality of sinking grooves are each disposed along a vertical direction and are disposed at intervals;
   wherein a direction of extension of each of the plurality of sinking grooves is consistent with a direction of extension of a data line in the display panel corresponding to the backlight module;
   wherein taking a side of the data line gradually going away from the flexible circuit board in the display panel as a first direction, a width of each of the plurality of sinking grooves gradually increases along the first direction; and wherein an orthogonal projection of the heat radiation material layer covers the sinking groove;
   wherein the backlight module further comprises a heat absorption layer, which is made of thermally conductive silicone and is attached to the sinking groove;
   wherein a plurality of protrusions are formed on a side of the heat absorption layer adjacent to the light plate to form a sawtooth structure.

16. A display device, comprising a display panel and a backlight module configured to provide a backlight source for the display panel:
   wherein the backlight module, comprises a back plate and a light plate disposed on the back plate; wherein a cavity is formed between the back plate and the light plate;
   wherein the backlight module further comprises a heat radiation material layer, which is disposed in the cavity and is attached to a side of the light plate facing the back plate; and
   wherein a gap is defined between the heat radiation material layer and the back;
   wherein the back plate is recessed towards a side away from the light plate to define a sinking groove, and wherein an orthographic projection of the heat radiation material layer covers the sinking groove.

* * * * *